US008843981B2

(12) United States Patent
Xie et al.

(10) Patent No.: US 8,843,981 B2
(45) Date of Patent: Sep. 23, 2014

(54) METHODS, APPARATUSES AND COMPUTER PROGRAMS FOR MEDIA STREAMING

(75) Inventors: Jinyang Xie, Shanghai (CN); Robbie Ling, Shanghai (CN); Yanming Xia, Beijing (CN); Michael Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/976,595

(22) PCT Filed: Dec. 28, 2010

(86) PCT No.: PCT/CN2010/080341
§ 371 (c)(1),
(2), (4) Date: Jun. 27, 2013

(87) PCT Pub. No.: WO2012/088656
PCT Pub. Date: Jul. 5, 2012

(65) Prior Publication Data
US 2013/0291043 A1    Oct. 31, 2013

(51) Int. Cl.
*H04N 21/462*    (2011.01)
*H04L 29/06*    (2006.01)
*H04N 21/61*    (2011.01)

(52) U.S. Cl.
CPC ........ *H04N 21/6156* (2013.01); *H04L 65/4084* (2013.01); *H04L 65/1069* (2013.01); *H04L 65/1006* (2013.01)
USPC ........... 725/110; 725/105; 725/109; 709/227; 709/228

(58) Field of Classification Search
USPC ................... 725/105, 109–110; 709/227–228
See application file for complete search history.

(56) References Cited

U.S. PATENT DOCUMENTS

| 6,618,585 B1 * | 9/2003 | Robinson ................... 455/3.02 |
| 2002/0095689 A1 * | 7/2002 | Novak .......................... 725/151 |

(Continued)

FOREIGN PATENT DOCUMENTS

| CN | 1640026 A | 7/2005 |
| CN | 1997148 A | 7/2007 |

(Continued)

OTHER PUBLICATIONS

Bionic Buffalo Corporation, "Bionic Buffalo Tech Note #103: Introduction to Pegasus Client Support", Apr. 8, 2003, 11 pages.

(Continued)

*Primary Examiner* — Mulugeta Mengesha
(74) *Attorney, Agent, or Firm* — Rothwell, Figg, Ernst & Manbeck, P.C.

(57) ABSTRACT

It is presented a method, executed in a media receiver connected to a media server in parallel via an internet protocol, IP, network and a cable television network. The method comprises the steps of: sending a media setup message to a middleware server, the media setup message comprising a content identifier, IP routing data and cable television routing data; receiving a setup confirmation message from the middleware server, the setup confirmation message comprising a transport indicator indicating which one of the IP network and the cable television network is to be used for media streaming from the media server to the media receiver; and receiving a media stream from the media server using either the IP network or the cable television network, as indicated by the transport indicator. Corresponding media receiver, middleware server, computer programs and computer program products are also presented.

22 Claims, 6 Drawing Sheets

(56) References Cited

U.S. PATENT DOCUMENTS

| | | | |
|---|---|---|---|
| 2004/0184432 A1* | 9/2004 | Gateva et al. | 370/349 |
| 2007/0140195 A1 | 6/2007 | Kaftan | |
| 2008/0086569 A1* | 4/2008 | Arora et al. | 709/231 |
| 2009/0131101 A1* | 5/2009 | Van Rooyen | 455/552.1 |
| 2012/0042349 A1* | 2/2012 | Ng et al. | 725/109 |

FOREIGN PATENT DOCUMENTS

| | | |
|---|---|---|
| CN | 101159824 A | 4/2008 |
| CN | 201657221 U | 11/2010 |

OTHER PUBLICATIONS

International Standard, "Information technology—Generic coding of moving pictures and associate audio information", ISO/IEC 13818-6, Oct. 15, 2000, 8 pages.

Open IPTV Forum, "Release 1 Specification: vol. 3—Content Metadata", V1.1, Oct. 8, 2009, OIPF, 650 Route des Lucioles, Sophia Antipolis, Valbonne, France, 47 pages.

Open IPTV Forum, "Release 1 Specification: vol. 4—Protocols", Open IPTV Forum, Aug. 28, 2012, V.1.2, OIPF, 650 Route des Lucioles, Sophia Antipolis, Valbonne, France, 194 pages.

Open IPTV Forum, "Release 1 Specification: vol. 5—Declarative Application Environment", V.1.2, OIPF, 650 Route des Lucioles, Sophia Antipolis, Valbonne, France, Aug. 27, 2012, 289 pages.

Roach, A.B., "Session Initiation Protocol (SIP)—Specific Event Notification", Network Working Group, Jun. 2002, 34 pages.

Schulzrinne, H., et al., "Real Time Streaming Protocol (RTSP)", Network Working Group, Apr. 1998, 81 pages.

Rosenberg, J., et al.,"SIP: Session Initiation Protocol", Network Working Group, Jun. 2002, 236 pages.

Yon, et al., "TCP-Based Media Transport in the Session Description Protocol (SDP)", Network Working Group, Sep. 2005, 14 pages.

Handley, M., et al., "SDP: Session Description Protocol", Network Working Group, Jul. 2006, 43 pages.

Joyce, G., et al., "DOCSIS IP-video Bypass Architecture (DIBA), an Architecture for IPTV over Cable", Consumer Communications and Networking Conference, 2009, CCNC 2009, 6TH IEEE, IEEE, Piscataway, NJ, USA, Jan. 10, 2009, pp. 1-4, XP031425587.

Supplementary European Search Report issued on Jul. 17, 2014, in corresponding application No. EP 10861227, 8 pages.

* cited by examiner

METHODS, APPARATUSES AND COMPUTER PROGRAMS FOR MEDIA STREAMING

CROSS-REFERENCE TO RELATED APPLICATION(S)

This application is a 35 U.S.C. §371 National Phase Entry Application from PCT/CN2010/080341, filed Dec. 28, 2010, designating the United States, the disclosure of which is incorporated by reference herein in its entirety.

TECHNICAL FIELD

The invention relates to media streaming and in particular media streaming over several network types.

BACKGROUND

Media streaming, such as IPTV (Internet Protocol Television) is gaining interest lately. IPTV allows the use of well defined IP networks for streaming, which allows the reuse of many positive aspects of streaming over the Internet. For example, Open IPTV Forum (OIPF) proposes the use of SIP (Session Initiation Protocol) for session initiation and session termination. There are often high capacity streaming resources available using existing cable television networks.

However, since IPTV and cable television networks use different signaling and streaming protocols, the IPTV system is not easily integrated with the cable television networks and vice versa.

SUMMARY

An object of embodiments herein is to provide a simpler and more robust way to combine an IP network and a cable television network for content delivery.

According to a first embodiment, it is presented a media receiver connectable to a media server in parallel via an internet protocol, IP, network and a cable television network. The media receiver comprises: a message transmitter arranged to send a media setup message to a middleware server, the media setup message comprising a content identifier, IP routing data for routing media to the media receiver using the IP network and cable television routing data for routing media to the media receiver using the cable television network; a message receiver arranged to receive a setup confirmation message from the middleware server, the setup confirmation message comprising a transport indicator indicating which one of the IP network and the cable television network is to be used for media streaming from the media server to the media receiver; and a streaming media receiver arranged to receive a media stream from the media server using either the IP network or the cable television network, as indicated by the transport indicator.

A single physical port of the media receiver may be arranged to connect to the IP network and the cable television network.

A second embodiment is a method, executed in a media receiver connected to a media server in parallel via an internet protocol, IP, network and a cable television network. The method comprises the steps of: sending a media setup message to a middleware server, the media setup message comprising a content identifier, IP routing data for routing media to the media receiver using the IP network and cable television routing data for routing media to the media receiver using the cable television network; receiving a setup confirmation message from the middleware server, the setup confirmation message comprising a transport indicator indicating which one of the IP network and the cable television network is to be used for media streaming from the media server to the media receiver; and receiving a media stream from the media server using either the IP network or the cable television network, as indicated by the transport indicator.

A single physical port of the media receiver may be used to connect to the IP network and the cable television network.

In the step of receiving the setup confirmation message, the setup confirmation message may comprise addressing data to the media streaming server.

The method may further comprise the step, prior to the step of receiving a media stream, of: sending a start message to the media server to start streaming media to the media receiver.

The start message is may be a play message in accordance with real time streaming protocol, RTSP.

In the step of receiving the setup confirmation message, the setup confirmation message may comprise tuning data, and the method may further comprise the step of: tuning the media receiver to receive media on a transport channel indicated by the tuning data.

The tuning data may comprise a frequency, a program ID, a transport stream ID, TSID, modulation type and symbol rate.

The media setup message may be an invite message in accordance with session initiation protocol and the setup confirmation message is a message according to session initiation protocol.

The media setup message may includes a cable network service group of the media receiver.

A third embodiment is a computer program for a media receiver connected to a media server in parallel via an internet protocol, IP, network and a cable television network. The computer program comprises computer program code which, when run on the media receiver causes the media receiver to: send a media setup message to a middleware server, the media setup message comprising a content identifier, IP routing data for routing media to the media receiver using the IP network and cable television routing data for routing media to the media receiver using the cable television network; receive a setup confirmation message from the middleware server, the setup confirmation message comprising a transport indicator indicating which one of the IP network and the cable television network is to be used for media streaming from the media server to the media receiver; and receive a media stream from the media server using either the IP network or the cable television network, as indicated by the transport indicator.

A fourth embodiment is a computer program product comprising a computer program according to the third embodiment and computer readable means on which the computer program is stored.

A fifth embodiment is a middleware server connectable to a media server and a media receiver, the media receiver being connectable to the media server in parallel via an internet protocol, IP, network and a cable television network. The middleware server comprises: a message receiver arranged to receive a media setup message from the media receiver, the media setup message comprising a content identifier, IP routing data for routing media to the media receiver using the IP network and cable television routing data for routing media to the media receiver using the cable television network; a determiner arranged to determine a transport indicator indicating which one of the IP network and the cable television network is to be used for media streaming from the media server to the media receiver; and a message transmitter arranged to send a setup confirmation message to the media receiver, the setup confirmation message comprising the transport indicator.

A sixth embodiment is a method, executed in a media middleware server connected to a media server and a media receiver, the media receiver being connected to the media server in parallel via an internet protocol, IP, network and a cable television network. The method comprises the steps of: receiving a media setup message from the media receiver, the media setup message comprising a content identifier, IP routing data for routing media to the media receiver using the IP network and cable television routing data for routing media to the media receiver using the cable television network; determining a transport indicator indicating which one of the IP network and the cable television network is to be used for media streaming from the media server to the media receiver; and sending a setup confirmation message to the media receiver, the setup confirmation message comprising the transport indicator.

The IP network and the cable television network may substantially share the same physical network. In particular in the part of the network that is closer to the media receiver, the IP network and the cable television network may share the same physical network.

The step of determining may involve evaluating resource usage in the cable television network.

The step of determining may involve evaluating resource usage of the media server.

The media setup message may be an invite message in accordance with session initiation protocol and the setup confirmation a message according to session initiation protocol.

The media setup message may include a cable network service group of the media receiver.

The method may further comprise the step of sending an initiation message to the media server to prepare to stream content identified by the content identifier.

The initiation message may be a setup message in accordance with real time streaming protocol, RTSP.

A seventh embodiment is a computer program for a media middleware server connected to a media server and a media receiver, the media receiver being connected to the media server in parallel via an Internet protocol, IP, network and a cable television network. The computer program comprises computer program code which, when run on the media middleware server causes the media middleware server to: receiving a media setup message from the media receiver, the media setup message comprising a content identifier, IP routing data for routing media to the media receiver using the IP network and cable television routing data for routing media to the media receiver using the cable television network; determining a transport indicator indicating which one of the IP network and the cable television network is to be used for media streaming from the media server to the media receiver; and sending a setup confirmation message to the media receiver, the setup confirmation message comprising the transport indicator.

An eighth embodiment is a computer program product comprising a computer program according to the seventh embodiment and computer readable means on which the computer program is stored.

It is to be noted that any feature of the first, second, third, fourth, fifth, sixth, seventh or eighth embodiments may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
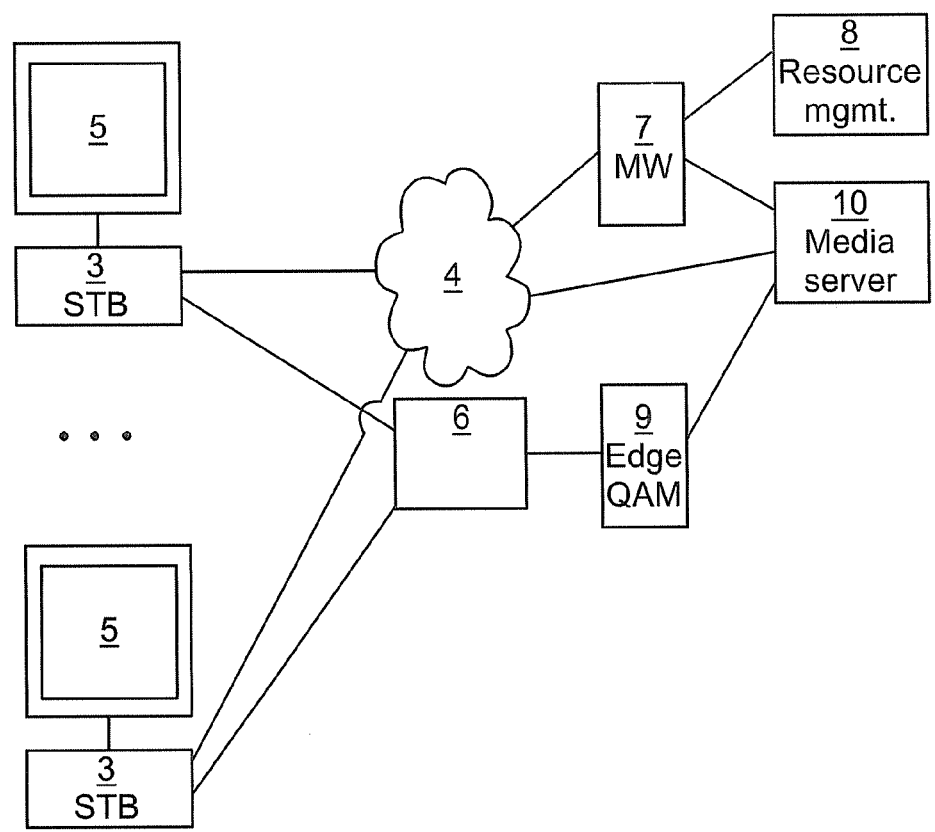
FIG. 1 is a schematic diagram showing an overview of an environment where media streaming in embodiments can be applied.

FIG. 1 is a schematic diagram showing an overview of an environment where media streaming in embodiments can be applied. A media server 10 is connected to an IP (Internet Protocol) network 4 and a cable television network 6, to allow delivery of streaming media to media receivers 3. The IP network 4 is configured to allow media delivery according to the IPTV (IP television) standard. The media server 10 connects to the cable television network 6 via an edge QAM (quadrature amplitude modulation) device 9. Each media receiver 3 is connected to both the IP network 4 and the cable television network 6. The media receiver 3 can be embodied in a set top box, computer, television, or any other type of device capable of receiving streaming content from the media server via both the IP network 4 and the cable television network 6. The media receiver 3 is also connected to a display 5, such as a television any other device capable of presenting the streaming content in the form of video and/or audio from the media server 10.

While the IP network 4 and the cable television network 6 are here depicted as two separate networks, the IP network 4 can be implemented using the cable television network 6 for delivery to the media receivers 3, as known per se. In other words, the IP network 4 and the cable television network 6 can substantially share the same physical network. In particular in the part of the network that is closer to the media receiver, the IP network 4 and the cable television 6 network may share the same physical network.

A middleware server 7 is also connected to the IP network 4 and to the media server 10. The middleware server 7 is also connected to a resource management device 8. One task of the middleware server 7 is to receive requests for media from the media receivers 3 and to dynamically determine an appropriate delivery network for the content from the media server 10, i.e. via the IP network 4 or via the cable television network 6. One input to such determination can be resource availability as provided by the resource management device 8.

The idea here is to support a hybrid solution, where all signaling is routed through the IP network, even when the streaming passes through the cable network. It is only needed to provide the narrowband bidirectional IP networks (only the signaling go through IP network and the streaming traffic can be transported by the cable television network). Currently, the DOCSIS (Data Over Cable Service Interface Specification) 2.0 standard is sufficient, which is already supported by most cable TV operators. In the IP network 4, SIP/RTSP can be used instead of DSM-CC (Digital storage media command and control) as the signaling control. In this way, pure IP network components can be reused, such as a CoD (Content on demand) Application server, content distribution system, etc., since such components do not support DSM-CC signaling.

Figure 2A:
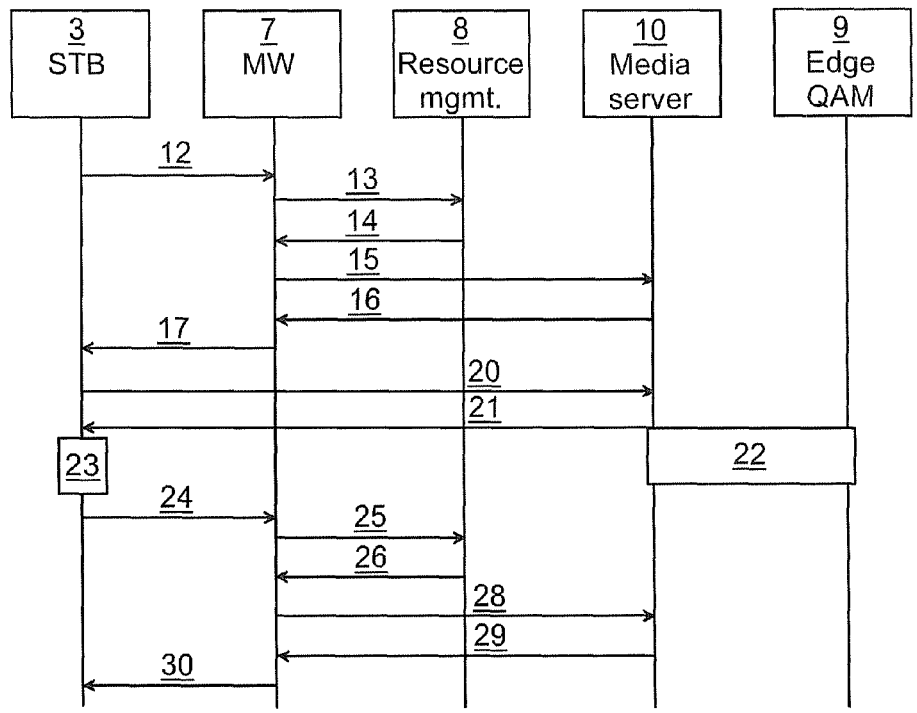
FIGS. 2*a* and 2*b* are sequence diagrams illustrating communication in embodiments of FIG. 1.
Figure 2B:
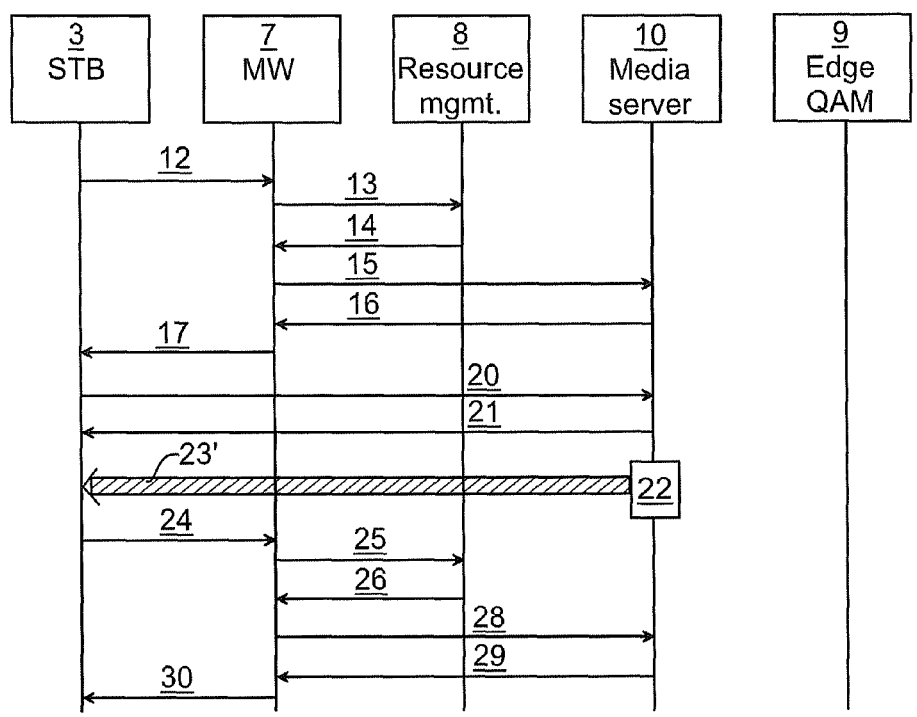

FIGS. 2a and 2b are sequence diagrams illustrating communication in embodiments of FIG. 1. In FIG. 2a, the media content is delivered over the cable TV network 6 and in FIG. 2b, the media content is delivered over the IP network.

Starting with FIG. 2a, the media receiver 3 sends a media setup message 12 to the middleware server to request content. This message can be a session initiation protocol (SIP) INVITE message. One example of such a message can be as follows:

---
INVITE sip:es.vod.OFP18688@10.2.6.123 SIP/2.0
Via: SIP/2.0/UDP 10.5.1.72:5060;branch=z9hG4bK-1180443107619999155
Max-Forwards: 70
To: <sip:es.vod.OFP18688@10.2.6.123>
From: user1 <sip:user1@iptv.ericsson.com>;tag=1180443107619999153
Call-ID: C-1180443107619999154@10.5.1.72
CSeq: 1 INVITE
P-Preferred-Identity: sip:user1@iptv.ericsson.com
Contact: user1 <sip:user1@10.5.1.72:5060;transport=udp>;+g.3gpp.icsi-ref="urn%3Aurn-xxx%3A3gpp-service.ims.icsi.iptv";+sip.instance="
<urn:uuid:00000000-0000-1000-8000-0008744C7F1D>"
Supported: timer
Allow: INVITE, UPDATE, ACK, BYE, CANCEL, OPTIONS, INFO, REFER, NOTIFY, SUBSCRIBE, MESSAGE
Session-Expires: 3600
Accept-Contact: *;+g.3gpp.icsi-ref="urn%3Aurn-xxx%3A3gpp-service.ims.icsi.iptv"
P-Preferred-Service: urn:urn-xxx:3gpp-service.ims.icsi.iptv
Session-Expires: 3600
Min-SE: 90
Content-Length: 266
Content-Type: application/sdp
v=0
o=- 1180443107599999 1 IN IP4 10.5.1.72
s=-
t=0 0
m=application 9 TCP iptv_rtsp
c=IN IP4 10.5.1.72
a=setup:active
a=connection:new
m=video 10002 RAW/RAW/UDP 33
c=IN IP4 10.5.1.72
a=recvonly
m=video 9 MP2T/DVBC/QAM 33
a=DVB-ServiceGroupId: sgId
a=recvonly
---

The sixth last line, starting with "m=video" and the subsequent line, starting with "c=IN" provides routing data to allow media content to be sent via the IP network. The third last line, starting with "m=video" together with subsequent line starting with "a=DVB" provides routing data to allow media to be sent via the cable network, e.g. using DVB (digital video broadcasting). The line "a=DVB-service-GroupId" indicates location information of devices in the cable television network. The content identifier is defined by the SIP URI, shown in the first line of the example message above, e.g. es.vod.OFP18688.

The middleware server 7 then sends a query 13 to the resource management device 8 asking for free resources, including resources on the cable television network 6 and/or the IP network 4. In one embodiment, it is the resource management device 8 that determines to use the cable television network 6 or the IP network for delivery of the content based on the resource using, client capability and bandwidth required for the content delivery and returns resource information 14 to the middleware server 7. In this example, the resource management device 8 has determined to use the cable TV network 6.

Next, the middleware server 7 can send a session setup request 15 to the media server 10 to buildup the stream session and receives a response 16.

The middleware server 7 then sends a setup confirmation message 17, e.g. a SIP OK message, to the media receiver 3. One example of such a message can be as follows:

---
SIP/2.0 200 OK
To: <sip:es.vod.OFP18688@iptv.ericsson.com>;tag=f2ad5t6i-4b
From: "user1"<sip:user1@iptv.ericsson.com>;tag=1180443107619999153
Call-ID: C-1180443107619999154@10.5.1.72
CSeq: 1 INVITE
Content-Length: 371
Via: SIP/2.0/UDP 10.5.1.72:5060;branch=z9hG4bK-1180443107619999155
Record-Route:
<sip:3Zqkv5baiCsip%3Auser1%40iptv.ericsson.com@pcscf.iptv.ericsson.com:5060;maddr=130.100.86.35;lr>
Contact: <sip:10.2.6.123:5060>
Content-Type: application/sdp
Allow: ACK, BYE, INFO, INVITE, OPTIONS, UPDATE
Supported: timer
Session-Expires: 3600;refresher=uac
v=0
o=- 2890844526 2 IN IP4 10.5.1.72
s=-
t=0 0
m=application 554 TCP iptv_rtsp
c=IN IP4 10.170.29.38
a=setup:passive
a=connection:new
a=fmtp:iptv_rtsp h-session=123345
a=fmtp:iptv_rtsp h-uri=rtsp://10.170.29.38:554/123345
a=fmtp:iptv_rtsp h-offset=0
m= video 9 MP2T/DVBC/QAM 33
a=DVB-ServiceGroupId: sgId
a=QAM: module=QAM64; Frequency=979; TSId=1; ProgramId=2; SymbolRate=0068750
b=AS:0
a=sendonly
---

In this example, the cable television network is used for content delivery, whereby the resource for such a content delivery will be reserved using the resource management device 8. The middleware server 7 thus includes in the SIP OK message tuning data, e.g. comprising a frequency, a program ID, a transport stream ID, TSID, modulation type and symbol rate. This allows the media server to tune to the media stream once it will start to be delivered over the cable television network 6. Also, the seventh last line indicates to the media receiver 3 to use a URI of "rtsp://10.170.29.38:554/123345" to send RTSP commands to the media server.

The media receiver 3 can then send a start play message 20 to the media server, such as an RTSP (real time streaming protocol) PLAY message to the media server 10. One example of such a message can be as follows:

```
PLAY rtsp://10.170.29.38:554/123345 RTSP/1.0
CSeq: 1
Session: 123345
Scale: 1
Range: npt=0-
RTSP/1.0 200 OK
CSeq: 1
Session: 123345
```

The media server 10 responds with a confirmation 21 and starts streaming the content 22 to the edge QAM 9 for delivery to the media receiver 3 which receives 23 the content over the cable television network 6.

Once the media receiver 3 wants to stop the streaming, the media receiver 3 sends a stop message 24, such as a SIP BYE message to the middleware server 7. One example of such a message can be as follows:

```
BYE sip:10.2.6.123:5060 SIP/2.0
Via: SIP/2.0/UDP 10.5.1.72:5060;branch=z9hG4bK-1180443149349999157
Max-Forwards: 70
Route:
<sip:3Zqkv5baiCsip%3Auser1%40iptv.ericsson.com@pcscf.iptv.ericsson.com:5060;maddr=130.100.86.35;lr>
To: <sip:es.vod.OFP18688@10.2.6.123>;tag=f2adcfg0-4i
From: user1 <sip:user1@iptv.ericsson.com>;tag=1180443107619999153
Call-ID: C-1180443107619999154@10.5.1.72
CSeq: 2 BYE
Supported: timer
Content-Length: 0
```

The middleware server 7 sends a message 25 to the resource management device 8 to release the resource used for the streaming and receives an confirmation message 26 for the release. Also, the middleware server 7 sends a stop session message 28 such as an RTSP TEARDOWN message to the media server 10, after which the media server 10 responds with a confirmation 29. Once the resource has been released and the media server has stopped the session, the middleware server 7 responds with a confirmation 30 to the media receiver 3, e.g. with a SIP OK message. One example of such a message can be as follows:

```
SIP/2.0 200 OK
To: <sip:es.vod.OFP18688@10.2.6.123>;tag=f2adcfg0-4i
From: "user1"<sip:user1@iptv.ericsson.com>;tag=1180443107619999153
Call-ID: C-1180443107619999154@10.5.1.72
CSeq: 2 BYE
Content-Length: 0
Via: SIP/2.0/UDP 10.5.1.72:5060;branch=z9hG4bK-1180443149349999157
```

In one embodiment, it is the media receiver 3 that determines whether to use the IP network 4 or the cable television 6. This can for example be as part of content selection, e.g. in URLs of a VoD (Video on Demand) catalogue. Additionally, the media receiver 3 can determine to use a particular network as a fall back position in case a connection using the suggested network fails. As an example, in such an embodiment, the STB can send the media setup message 12 only including routing data for using the cable television network 4. One example of such a message is a SIP INVITE message as follows:

```
INVITE sip: IPTV_CoD_Service OFP18688@10.2.6.123 SIP/2.0
Via: SIP/2.0/UDP 10.5.1.72:5060;branch=z9hG4bK-1180443107619999155
Max-Forwards: 70
To: <sip: IPTV_CoD_Service OFP18688@10.2.6.123>
From: user1 <sip:user1@iptv.ericsson.com>;tag=1180443107619999153
Call-ID: C-1180443107619999154@10.5.1.72
CSeq: 1 INVITE
P-Preferred-Identity: sip:user1@iptv.ericsson.com
Contact: user1 <sip:user1@10.5.1.72:5060;transport=udp>;+g.3gpp.icsi-ref="urn%3Aurn-xxx%3A3gpp-service.ims.icsi.iptv";+sip.instance="<urn:uuid:00000000-0000-1000-8000-0008744C7F1D>"
Supported: timer
Allow: INVITE, UPDATE, ACK, BYE, CANCEL, OPTIONS, INFO, REFER, NOTIFY, SUBSCRIBE, MESSAGE
Session-Expires: 3600
Accept-Contact: *;+g.3gpp.icsi-ref="urn%3Aurn-xxx%3A3gpp-service.ims.icsi.iptv"
P-Preferred-Service: urn:urn-xxx:3gpp-service.ims.icsi.iptv
Session-Expires: 3600
Min-SE: 90
Content-Length: 156
Content-Type: application/sdp
v=0
o=- 1180443107599999 1 IN IP4 10.5.1.72
s=-
t=0 0
m=application 9 TCP iptv_rtsp
c=IN IP4 10.5.1.72
a=setup:active
a=connection:new
m=video 9 MP2T/DVBC/QAM 33
b=AS:17000
a=recvonly
a=DVB-ServiceGroupId =1234.5678
```

Compared to the SIP INVITE message above, this message does not contain the lines "m=video 10002 RAW/RAW/UDP 33", "c=IN IP4 10.5.1.72" and "a=recvonly". In other words, this SIP INVITE message does not contain data to route the content using the IP network 4. The rest of the sequence is the same as the previous sequence, with the exception of the resource management. In this embodiment, the resource management is only used need to assign resource for this user. The setup confirmation message 17, e.g. a SIP OK message, to the media receiver 3 for this embodiment can then have the following structure:

```
SIP/2.0 200 OK
To: <sip: IPTV_CoD_Service OFP18688@iptv.ericsson.com>;tag=f2ad5t6i-4b
From: "user1"<sip:user1@iptv.ericsson.com>;tag=1180443107619999153
Call-ID: C-1180443107619999154@10.5.1.72
CSeq: 1 INVITE
Content-Length: 349
Via: SIP/2.0/UDP 10.5.1.72:5060;branch=z9hG4bK-1180443107619999155
Record-Route:
<sip:3Zqkv5baiCsip%3Auser1%40iptv.ericsson.com@pcscf.iptv.ericsson.com:5060;maddr=130.100.86.35;lr>
Contact: <sip:10.2.6.123:5060>
Content-Type: application/sdp
Allow: ACK, BYE, INFO, INVITE, OPTIONS, UPDATE
Supported: timer
Session-Expires: 3600;refresher=uac
v=0
o=- 2890844526 2 IN IP4 10.5.1.72
s=-
t=0 0
m=application 554 TCP iptv_rtsp
c=IN IP4 10.2.6.123
a=setup:passive
```

```
a=connection:new
a=fmtp:iptv_rtsp h-session=56465465
a=fmtp:iptv_rtsp h-uri=rtsp://10.2.6.123/823527
a=fmtp:iptv_rtsp h-offset=0
m=video 4002 MP2T/DVBC/QAM 33
b=AS:0
a=sendonly
a=QAM: module=QAM64; Frequency=979; TSId=1; ProgramId=2;
SymbolRate=0068750
```

FIG. 2b illustrates a scenario where the media content is delivered over the IP network 4. Messages 12 to 16 correspond to those of the scenario of FIG. 2a. However since the middleware server 7, e.g. using the resource management device 8, here determines that the IP network 4 is to be used for content delivery, the setup confirmation message 17 to the media receiver is slightly different. One example of such a message can be a SIP OK message as follows:

```
SIP/2.0 200 OK
To: <sip:vod_id@iptv.ericsson.com>;tag=f2ad5t6i-4b
From: "user1"<sip:user1@ericsson.se>;tag=1180443107619999153
Call-ID: C-1180443107619999154@10.5.1.72
CSeq: 1 INVITE
Content-Length: 349
Via: SIP/2.0/UDP 10.5.1.72:5060;branch=z9hG4bK-
1180443107619999155
Record-Route:
<sip:3Zqkv5baiCsip%3Auser1%40st.nrg.hf.sw.erics-
son.se@pcscf.st.nrg.hf.sw.ericsson.se:5060;maddr=130.100.86.35;lr>
Contact: <sip:10.2.6.123:5060>
Content-Type: application/sdp
Allow: ACK, BYE, INFO, INVITE, OPTIONS, UPDATE
Require: timer
Supported: timer
Session-Expires: 3600;refresher=uac
v=0
o=- 2890844526 2 IN IP4 10.5.1.72
s=-
t=0 0
m=application 554 tcp iptv_rtsp
c=IN IP4 10.2.6.123
a=setup:passive
a=connection:new
a=fmtp:iptv_rtsp h-session=56465465
a=fmtp:iptv_rtsp h-uri=rtsp://ericsson.com/sports/8231527
a=fmtp:iptv_rtsp h-offset=0
m=video 4002 UDP/RAW/RAW 33
c=IN IP4 10.2.6.123
b=AS:0
a=sendonly
```

It can be seen at the last three lines of the message that the IP network 4 is used for content delivery.

The content delivery 22 from the media server 10 then goes via the IP network 4 to the media receiver 3. The messages 24 to 30 for ending the content stream correspond to what is described in with reference to FIG. 2a.

Figure 3A:
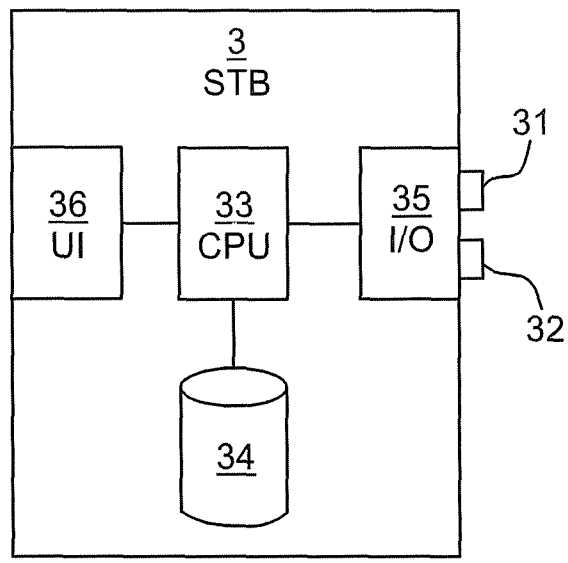
FIG. 3*a* is a schematic diagram showing components of a media receiver of FIG. 1.

FIG. 3a is a schematic diagram showing components of a media receiver of FIG. 1. A controller 33 is provided using any suitable central processing unit (CPU), microcontroller, digital signal processor (DSP), etc., capable of executing software instructions stored in a computer readable media 34, e.g., memory. The computer readable media 34 can be any combination of read and write memory (RAM) and read only memory (ROM). The computer readable media 34 also comprises persistent storage, which, for example, can be any single one or combination of magnetic memory, optical memory, or solid state memory.

An input/output (I/O) interface 35 is provided to allow the media receiver 3 receive content and communicate with the middleware server 7. The I/O interface 35 can be provided with two ports 31, 32, namely one cable television connector 31 and one network connector 32, such as an Ethernet connector. Optionally, the cable television connector 31 is only provided, whereby both IP traffic and cable television content is provided using a single physical connection between the media receiver 3 and the cable television network 6. In other words, the cable television connector 31 is a single physical port of the media receiver 3 arranged to connect to both the IP network 4 and the cable television network 6.

A user interface 36 is provided to allow a user to interact with the media receiver 3. The user interface can comprise the use of the display 5 and an infrared or radio frequency remote control.

Figure 3B:
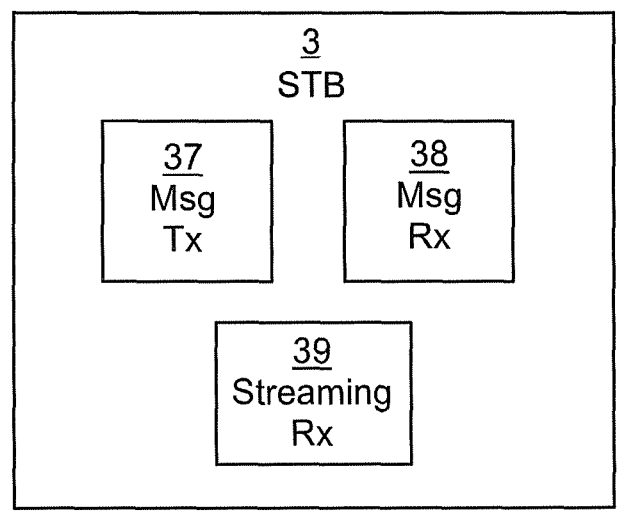
FIG. 3*b* is a schematic diagram showing functional modules of a media receiver of FIG. 1.

FIG. 3b is a schematic diagram showing functional modules of a media receiver of FIG. 1. The modules can be implemented using software such as a computer program executing in the media receiver 3. All modules depend on an execution environment which can utilise the controller 33, computer program product 34 and I/O interface 35 of FIG. 3a. The modules implement communication of the media receiver 3 of FIGS. 2a and 2b.

A message transmitter 37 is arranged to send the media setup message to the middleware server 7. The media setup message comprises a content identifier, IP routing data for routing media to the media receiver 3 using the IP network 4 and cable television routing data for routing media to the media receiver 3 using the cable television network 6. This provides the middleware server 7 with all the data to route media content to the media receiver using either transport network.

A message receiver 38 is arranged to receive the setup confirmation message from the middleware server 7. The setup confirmation message comprises a transport indicator indicating which one of the IP network 4 and the cable television network 6 is to be used for subsequent media streaming from the media server 10.

A streaming media receiver 39 is arranged to receive the media stream from the media server 10 using either the IP network 4 or the cable television network 6, as indicated by the transport indicator.

Figure 4A:
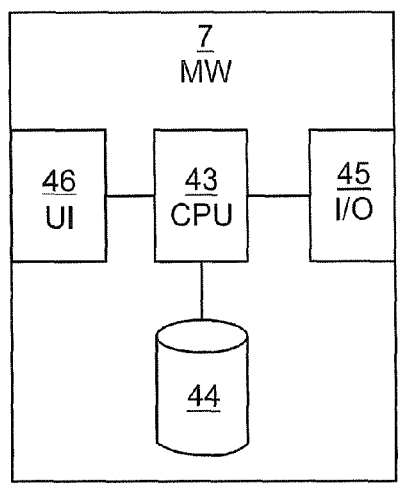
FIG. 4*a* is a schematic diagram showing components of a middleware server of FIG. 1.

FIG. 4a is a schematic diagram showing components of a middleware server of FIG. 1.

A controller 43 is provided using any suitable central processing unit (CPU), microcontroller, digital signal processor (DSP), etc., capable of executing software instructions stored in a computer readable media 44, e.g., memory. The computer readable media 44 can be any combination of read and write memory (RAM) and read only memory (ROM). The computer readable media 44 also comprises persistent storage, which, for example, can be any single one or combination of magnetic memory, optical memory, or solid state memory.

An input/output interface 45 is provided to allow the middleware server 7 to communicate with other entities such as the media receivers 3, media server 10 and resource management device 8.

A local user interface 46 is optionally provided to allow a user to interact with the middleware server 7. The user interface can include a display and an input device such as a keyboard, a touch function of the display and/or a positional input device such as a mouse, trackball, etc.

Figure 4B:
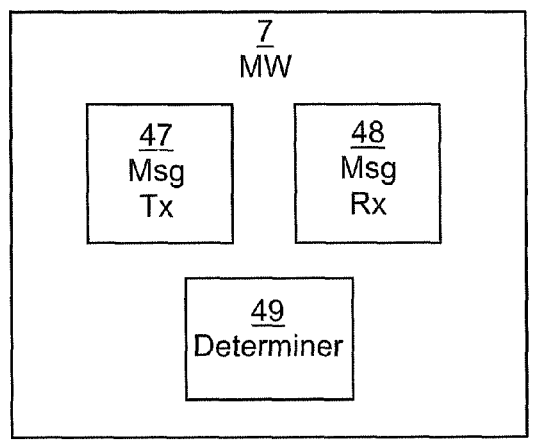
FIG. 4*b* is a schematic diagram showing functional modules of the middleware server FIG. 1.

FIG. 4b is a schematic diagram showing functional modules of the middleware server FIG. 1. The modules can be implemented using software such as a computer program executing in the middleware server 7. All modules depend on an execution environment which can utilise the controller 43, computer program product 44 and I/O interface 45 of FIG. 4*a*. The modules implement communication of the middleware server 7 of FIGS. 2*a* and 2*b*.

A message receiver 48 is arranged to receive the media setup message from the media receiver 3, where the media setup message comprises a content identifier, IP routing data for routing media to the media receiver 3 using the IP network 4 and cable television routing data for routing media to the media receiver 3 using the cable television network 6.

A determiner 49 is arranged to determine a transport indicator indicating which one of the IP network 4 and the cable television network 6 is to be used for media streaming from the media server 10 to the media receiver 3.

A message transmitter 47 is arranged to send a setup confirmation message to the media receiver 3, where the setup confirmation message comprises the transport indicator.

Figure 5:
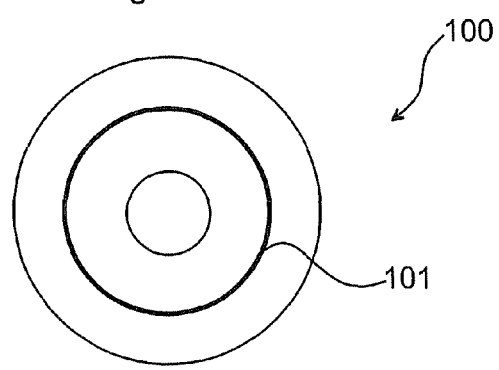
FIG. 5 shows one example of a computer program product comprising computer readable means.

FIG. 5 shows one example of a computer program product comprising computer readable means. On this computer readable means a computer program 101 can be stored, which computer program can cause a controller to execute a method according to embodiments described herein. In this example, the computer program product 100 is an optical disc, such as a CD (compact disc) or a DVD (digital versatile disc) or a Blu-Ray disc. As explained above, the computer program product could also be embodied as a memory of a device, such as memory 34 of the media receiver or memory 44 of the middleware server 7. While the computer program 101 is here schematically shown as a track on the depicted optical disk, the computer program can be stored in any way which is suitable for the computer program product.

Figure 6:
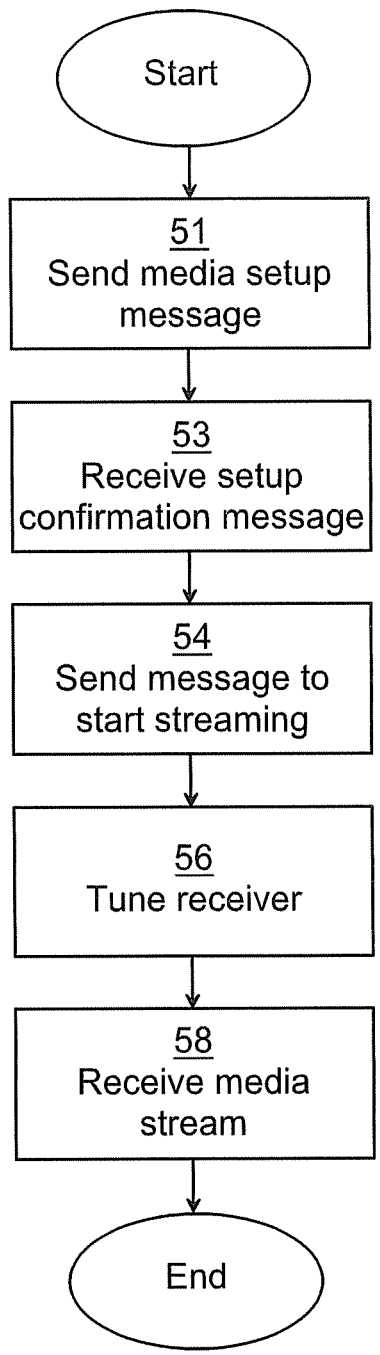
FIG. 6 is a flow chart illustrating an embodiment of a method implemented in a media receiver of FIG. 1.

FIG. 6 is a flow chart illustrating an embodiment of a method implemented in a media receiver 3 of FIG. 1. The method implements the messaging of the media receiver 3 in FIGS. 2*a* and 2*b*. The method can be executed by a computer program of a computer program product.

In a step 51 to send media setup message, the media setup message is sent to the middleware server 7. The media setup message can be a SIP INVITE message as explained above and can include a cable network service group of the media receiver 3.

In a receive setup confirmation message step 53, the setup confirmation message from the middleware server 7 is received. The setup confirmation message comprises a transport indicator indicating which one of the IP network 4 and the cable television network 6 is to be used for media streaming from the media server 10 to the media receiver 3. As explained in more detail above, the setup confirmation message may be a SIP OK message. The setup confirmation message can comprise tuning data, e.g. comprising a frequency, a program ID, a transport stream ID (TSID), modulation type (such as QAM 64, QAM128, QAM16) and symbol rate. The setup confirmation message can also comprise addressing data to the media streaming server.

In a send message to start streaming step 54, a start message is sent to the media server 10 to start streaming media to the media receiver. This start message can e.g. be a play message in accordance with real time streaming protocol, RTSP.

In a tuning step 56 the media receiver 3 tunes to receive media on a transport channel indicated by the tuning data, i.e. the cable television network 6 or the IP network 4. If the cable television network 6 is used, the tuning data of the setup confirmation message can be used to tune the media receiver 3 appropriately.

In a receive media stream step 58, the media stream from the media server 10 is received using either the IP network 4 or the cable television network 6, as indicated by the transport indicator.

Figure 7:
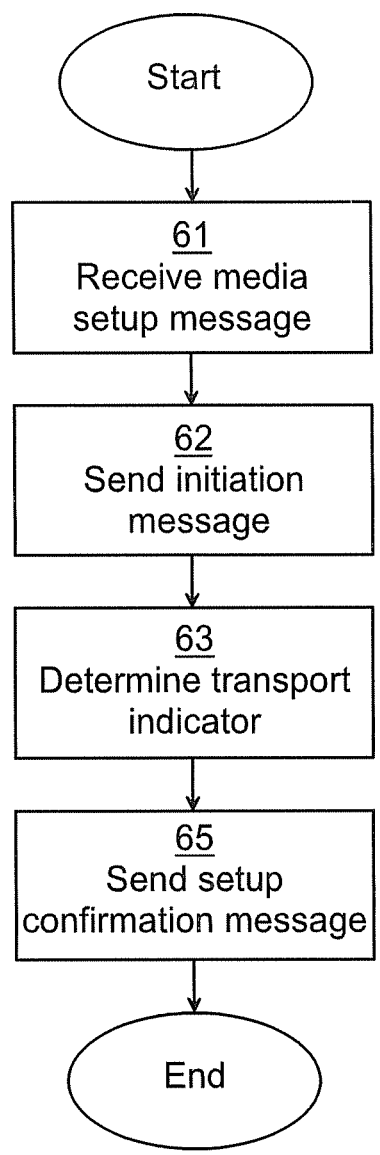
FIG. 7 is a flow chart illustrating an embodiment of a method implemented in a middleware server of FIG. 1.

FIG. 7 is a flow chart illustrating an embodiment of a method implemented in a middleware server of FIG. 1. The method implements the messaging of the middleware server 7 in FIGS. 2*a* and 2*b*. The method can be executed by a computer program of a computer program product.

In a receive media setup message step 61, the media setup message is received from the media receiver 3. As explained above, the media setup message can be a SIP INVITE message.

In a send initiation message step 62, an initiation message is sent to the media server to prepare to stream content identified by the content identifier of the media setup message. The initiation message can for example be an RTSP SETUP message.

In a determine transport indicator step 63, the transport indicator is determined. The transport indicator indicates which one of the IP network 4 and the cable television network 6 is to be used for media streaming from the media server 10 to the media receiver 3. The transport indicator can be determined taking into consideration an evaluation of resource usage in the cable television network 6 or resource usage of the media server 3, media type (such as bitrate), etc.

In a send setup confirmation message, a setup confirmation message 65 is sent to the media receiver 3, where the setup confirmation message comprises the transport indicator. As explained above, the setup confirmation message can be a SIP OK message.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A media receiver connectable to a media server via an internet protocol (IP) network and a cable television network, the media receiver comprising:
    a message transmitter arranged to send a media setup message to a middleware server, the media setup message comprising a content identifier, IP routing data for routing media to the media receiver using the IP network, and cable television routing data for routing media to the media receiver using the cable television network;
    a message receiver arranged to receive a setup confirmation message from the middleware server, the setup confirmation message comprising a transport indicator indicating which one of the IP network and the cable television network is to be used for media streaming from the media server to the media receiver; and
    a streaming media receiver arranged to receive a media stream from the media server using either the IP network or the cable television network, as indicated by the transport indicator.

2. The media receiver according to claim 1, wherein a single physical port of the media receiver is arranged to connect to the IP network and the cable television network.

3. A method, executed in a media receiver connected to a media server via an internet protocol (IP) network and a cable television network, the method comprising the steps of:
    sending a media setup message to a middleware server, the media setup message comprising a content identifier, IP routing data for routing media to the media receiver using the IP network, and cable television routing data for routing media to the media receiver using the cable television network;
    receiving a setup confirmation message from the middleware server, the setup confirmation message comprising a transport indicator indicating which one of the IP network and the cable television network is to be used for media streaming from the media server to the media receiver; and receiving a media stream from the media server via the network identified by the transport indicator.

4. The method according to claim 3, wherein a single physical port of the media receiver is used to connect to the IP network and the cable television network.

5. The method according to claim 3, wherein the setup confirmation message further comprises addressing data for the media streaming server.

6. The method according to claim 3, further comprising the step, prior to the step of receiving a media stream, of: sending a start message to the media server to start streaming media to the media receiver.

7. The method according to claim 6, wherein the start message is a play message in accordance with real time streaming protocol, RTSP.

8. The method according to claim 3, wherein the setup confirmation message further comprises tuning data identifying a transport channel, and the method further comprises the step of: tuning the media receiver to receive media on the transport channel indicated by the tuning data.

9. The method according to claim 8, wherein the tuning data comprises a frequency, a program ID (PID), a transport stream ID (TSID), modulation type, and symbol rate.

10. The method according to claim 3, wherein the media setup message is an invite message in accordance with the Session Initiation Protocol (SIP) and the setup confirmation message is a SIP message.

11. The method according to claim 10, wherein the media setup message includes a cable network service group of the media receiver.

12. A computer program product comprising a non-transitory computer readable medium storing computer program code for use by a media receiver connected to a media server via an internet protocol (IP) network and a cable television network, wherein the computer program code, when run on the media receiver, causes the media receiver to:

send a media setup message to a middleware server, the media setup message comprising a content identifier, IP routing data for routing media to the media receiver using the IP network, and cable television routing data for routing media to the media receiver using the cable television network;

process a setup confirmation message received from the middleware server, the setup confirmation message comprising a transport indicator indicating which one of the IP network and the cable television network is to be used for media streaming from the media server to the media receiver; and receive a media stream from the media server using either the IP network or the cable television network, as indicated by the transport indicator.

13. A middleware server connectable to a media server and a media receiver, the media receiver being connectable to the media server via an internet protocol (IP) network and a cable television network, the middleware server comprising:

a message receiver arranged to receive a media setup message from the media receiver, the media setup message comprising a content identifier, IP routing data for routing media to the media receiver using the IP network and cable television routing data for routing media to the media receiver using the cable television network;

a determiner arranged to determine a transport indicator indicating which one of the IP network and the cable television network is to be used for media streaming from the media server to the media receiver; and a message transmitter arranged to send a setup confirmation message to the media receiver, the setup confirmation message comprising the transport indicator.

14. A method, executed in a media middleware server connected to a media server and a media receiver, the media receiver being connected to the media server via an internet protocol (IP) network and a cable television network, the method comprising the steps of:

receiving a media setup message from the media receiver, the media setup message comprising a content identifier, IP routing data for routing media to the media receiver using the IP network, and cable television routing data for routing media to the media receiver using the cable television network;

selecting one of the IP network and the cable television network to be used for media streaming from the media server to the media receiver; and sending a setup confirmation message to the media receiver, the setup confirmation message comprising a transport indicator identifying the selected network.

15. The method according to claim 14, wherein the IP network and the cable television network substantially share the same physical network.

16. The method according to claim 14, wherein selecting one of the networks comprises evaluating resource usage in the cable television network.

17. The method according to claim 14, wherein selecting one of the networks comprises evaluating resource usage of the media server.

18. The method according to claim 14, wherein the media setup message is an invite message in accordance with the Session Initiation Protocol (SIP) and the setup confirmation is a SIP message.

19. The method according to claim 18, wherein the media setup message includes a cable network service group of the media receiver.

20. The method according to claim 14, further comprising the step of sending an initiation message to the media server to prepare to stream content identified by the content identifier.

21. The method according to claim 20, wherein the initiation message is a setup message in accordance with real time streaming protocol, RTSP.

22. A computer program product comprising a non-transitory computer readable medium storing computer program code for use by a media middleware server connected to a media server and a media receiver, the computer program code comprising computer program code that, when run on the media middleware server, causes the media middleware server to:

process a received media setup message transmitted from the media receiver, the media setup message comprising a content identifier, IP routing data for routing media to the media receiver using the IP network, and cable television routing data for routing media to the media receiver using the cable television network;

select one of an IP network and a cable television network to be used for media streaming from the media server to the media receiver; and send a setup confirmation message to the media receiver, the setup confirmation message comprising a transport indicator identifying the selected network.

* * * * *